Patented Feb. 27, 1945

2,370,500

UNITED STATES PATENT OFFICE 2,370,500

DIRECT BLUE AZO DYES

Chiles E. Sparks, Wilmington, Del., assignor to E. I. du Pont de Nemours & Company, Wilmington, Del., a corporation of Delaware No Drawing. Application December 17, 1940, Serial No. 370,484

9 Claims. (Cl. 260—170)

This invention relates to new azo compounds, among which are new direct blue azo dyes from which dyeings on cellulosic and similar fibers in deep bright shades can be produced, and excellent washing fastness in bright shades can be obtained when the dyeings are given an after-treatment with formaldehyde.

Numerous examples of direct colors in blue shades are recorded in the literature, which are useful because of their substantivity to cellulose fibers, their bright shades and their moderate fastness to light. These products are very fugitive to washing. Upon washing they show considerable loss in strength and they impart an undesirable stain to associated uncolored or differently colored fibers. Some improvement in washing fastness has been attained through the use of the so-called diazo colors where certain kinds of direct colors are azotized on the fiber and then developed with suitable coupling components. These diazo colors are faster to washing than the direct colors referred to, but they are usually duller in shade than the corresponding direct colors. The chief objections to the use of diazo colors are the considerable shade change which usually results upon development and the effort or material expense to be borne by the dyer who must carry out the development.

It is desirable to provide blue dyes having the simplicity of application and freedom from shade change upon dyeing of the direct colors together with the good washing fastness of the diazo dyes. It has now been found that this can be accomplished by after-treating with formaldehyde the direct dyeings of certain types of azo dyes hereinafter to be disclosed. There is very little shade change produced by after-treatment of the new dyes, and the washing fastness of this type of dyes equals and sometimes surpasses that of the diazo colors.

It is among the objects of this invention to provide new azo dyes which dye dyeable fibers in strong deep shades of blue having excellent brightness and washing fastness. Another object of the invention is to provide processes for producing the dyeing and processes for manufacturing the dyes. Still other objects of the invention will be apparent from the following more detailed description.

The objects of the invention are attained in general by providing azo compounds which may be represented in their acid forms generally by the formulae Y←X→A→C and Y←X→B→B→C wherein Y and C are different types of azo dye coupling components, Y being a type of naphthol or an N-substituted naphthylamine sulfonic acid and C being a 1,3-dihydroxybenzene. The symbol X represents a class of diamine biphenyl compounds. This is the first component of the compound, and A and B each represent members of the naphthylamine series. The azo compounds can be made by tetrazotizing the diamino biphenyl compound X and coupling with one mol equivalent of the compound Y and one mol equivalent of the compound A or B as the case may be. The resulting product Y←X→A→NH$_2$ is diazotized and coupled with a compound C when a trisazo compound is desired, or the disazo intermediate Y←X→B—NH$_2$ is diazotized and coupled with another mol of a B component when a tetrakisazo dye is desired. In the latter case the intermediate Y←X→B→B—NH$_2$ is diazotized and coupled to the compound C. The components are chosen so that the products contain at least two solubilizing groups such as sulfonic acid. The final couplings are made in a medium which is made alkaline with an appropriate alkali metal or ammonium base, such as sodium or ammonium carbonate and the products are isolated in the form of the alkali metal or ammonium salts. The acid form of the compounds may be made by acidifying a solution of the alkali salt of the compound and separating the resulting compound from the acid solution.

In the form of alkali and ammonium salts the compounds are soluble in water and direct dyeings on cotton, regenerated cellulose rayon and similar cellulosic fibers are made from such solutions. The direct dyeings may then be treated with formaldehyde to form a formaldehyde complex on the fiber. By this treatment, superior washing fastness is attained and brightness is retained. The dyeings have good light fastness but some improvement in light fastness can be obtained by treating the dyeings with certain metal salts, either before or after the formaldehyde treatment.

The invention will be more fully set forth in the following more detailed description which includes examples that are given as illustrative embodiments of the invention and not as limitations thereof. Parts are expressed in parts by weight unless otherwise noted.

EXAMPLE I

Dianisidine (244 parts) was slurried in 3000 parts of water at 20° C. and 192 parts of hydrochloric acid were added. The solution was tetrazotized by adding 139 parts of sodium nitrite and sufficient excess of sodium nitrite was maintained for 30 minutes to give a distinct test for nitrite.

Another solution was made by dissolving 246 parts of 1-naphthol-4-sulfonic acid in 1450 parts of water containing 53 parts of soda ash, or sufficient soda ash to dissolve the acid and leave the solution neutral to brilliant yellow.

The solution of dianisidine tetrazo was cooled to 0° C. and sodium bicarbonate was added until it was just acid to litmus. Then 5% salt on the volume of solution was added. The solution of 1-naphthol-4-sulfonic acid was slowly added to the solution of tetrazo over a period of about 10 minutes. During this period the temperature of the mixture was maintained at 0° C. ±2° C. with vigorous agitation and sufficient sodium bicarbonate was added to keep the acidity so that coupling proceeded slowly.

The coupling with the 1-naphthol-4-sulfonic acid was balanced so that there was neither an excess of dianisidine tetrazo nor an excess of 1,4-hydroxy acid. The mixture was then made acid to litmus with acetic acid and a neutral solution of 223 parts of 1,6-Cleve's acid in about 1400 parts of water with sufficient soda ash to dissolve the Cleve's acid was added. The temperature was held at 5° C. and good agitation was maintained for 12 hours.

The mixture was then made alkaline to brilliant yellow with soda ash, heated to 65° C. and salted to 10% on the volume with sodium chloride. The insoluble material was then isolated by filtration.

The press cake from the foregoing operation was slurried in about 5000 parts of water, and the mixture was made acid to Congo red with 100 parts of hydrochloric acid. After cooling the slurry to about 10° C., 69 parts of sodium nitrite was added as rapidly as it would react. An excess nitrite and distinct acidity to Congo red was maintained for 2 hours.

Resorcinol (150 parts) was dissolved in 500 parts of water, cooled to 0° C. and 320 parts of sodium carbonate were added as a saturated aqueous solution. The solution was cooled to 0° C. and the slurry of the diazo was added to this solution over a period of about ½ hour. Good agitation, sodium carbonate alkalinity and a temperature of 0–5° C. were maintained. The mixture was then stirred for one hour longer. The mixture was then heated to 65° C., salted slowly to 8% on volume or until a spot of the slurry on filter paper showed only a light rim of color, and filtered. The product was dried at 75° C. The dry powder was blue-black in appearance and is represented by the formula:

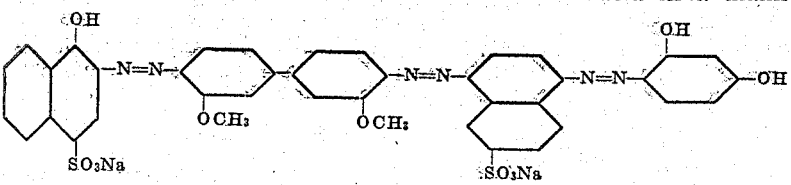

A dyeing was made with this product and after-treated as follows.

*Dyeing procedure*

Three-tenths of a gram of the product was dissolved in 100 cc. of water at 190–200° F. and 0.06 gram of sodium carbonate was added to assist the dyeing. The solution was diluted with stirring to a total volume of 400 cc. with water at approximately 160° F. and 50 cc. of a 10% solution of Glauber's salt were added. A 10 gram piece of regenerated cellulose was wet out with water, squeezed partially dry and placed in the dye-bath. The temperature of the dye-bath was raised to 180°–190° F. during a period of 15 minutes and held at that temperature for one hour. The bath was stirred at frequent intervals during the dyeing and at the end of one hour the dyed piece was removed and rinsed in cold water.

*After-treatment in a fresh bath*

The rinsed dyeing from the above operation was entered into 500 cc. of water at 130°–140° F. and approximately 10 cc. of a 10% formaldehyde solution (25 cc. of approximately 37% formaldehyde by weight diluted to 250 cc. with water) were added. The bath was held at this temperature for 20 minutes and then the dyeing was removed, rinsed and dried.

*After-treatment in the dye bath*

An alternative after-treatment which is the preferred procedure because of its economy and ease of application was carried out as follows: At the end of the dyeing period 10 cc. of the 10% formaldehyde solution were added to the dyebath at bath temperature. The dyeings were removed after 20 minutes, rinsed and dried.

A dyeing with a red shade of navy blue was obtained which showed excellent brightness and fastness to washing.

It will be understood by those skilled in the art that many variations in the temperature, concentration and other conditions of the dyeing operations can be made without essentially altering the dyeing or the fastness properties of the dyeings.

By using an equivalent amount of chromotropic acid instead of 1-naphthol-4-sulfonic acid in the foregoing process a dye having properties similar to those of the above described dye, except that it gave dyeings in green blue shades was produced. The dye is represented by the formula

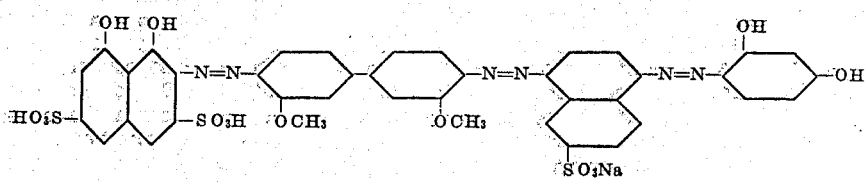
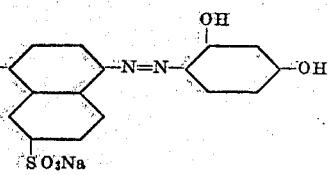

EXAMPLE II

Dianisidine (224 parts) was tetrazotized and coupled first to 246 parts of 1-naphthol-4-sulfonic acid and then to 223 parts of 1,6-Cleve's acid in a manner similar to that directed in Example I. This product was isolated, reslurried and diazotized as in Example I. The diazo slurry

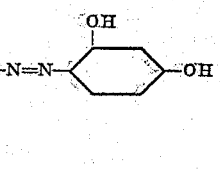

was cooled to 5° C. and made neutral to Congo red with sodium acetate. To this diazo slurry was added a neutral solution of 223 parts of 1,6-Cleve's acid in about 1400 parts of water with sufficient soda ash to dissolve the Cleve's acid. The mixture was held at a temperature of 5° C., made neutral to Congo red and acid to litmus and agitated for 12 hours. Then the mixture was made alkaline to brilliant yellow with soda ash, heated to 65° C. and salted to 10% on the volume with sodium chloride. The insoluble material was then filtered off.

The press cake was slurried in about 5000 parts of water and made acid to Congo red with about 100 parts of hydrochloric acid. After cooling the slurry to 10° C., 69 parts of sodium nitrite were added as rapidly as it would react. An excess of nitrite and acidity to Congo red were maintained for two hours.

Resorcinol (150 parts) was dissolved in 500 parts of water, cooled to 0° C. and 320 parts of sodium carbonate were added thereto as a saturated aqueous solution. The solution was cooled to 0° C. and the diazo was added to the solution over a period of ½ hour. Good agitation, sodium carbonate alkalinity and a temperature of 0–5° C. were maintained and the cooled mixture was stirred for one hour. After one hour the mixture was heated to 65° C. and salted slowly to 8% on volume or until a spot of the slurry on filter paper showed only a light rim of color. The product was filtered off and dried at 75° C. The dry powder was blue-black in appearance.

The product is represented by the formula:

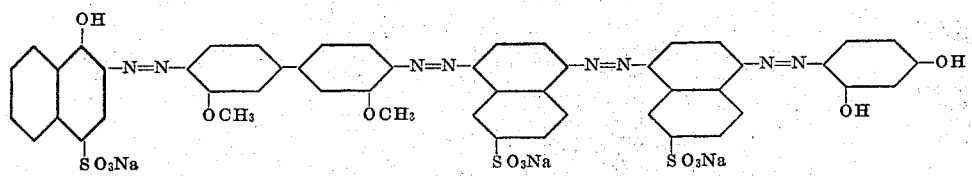

When dyed and after-treated as in Example I, the product yielded dyeings on regenerated cellulose rayon of a navy blue shade which were fast to washing.

EXAMPLE III

A product represented by the following formula was prepared by the procedure used in Example I, except that 315 parts of phenyl J-acid were used instead of 246 parts of 1,4-hydroxy acid.

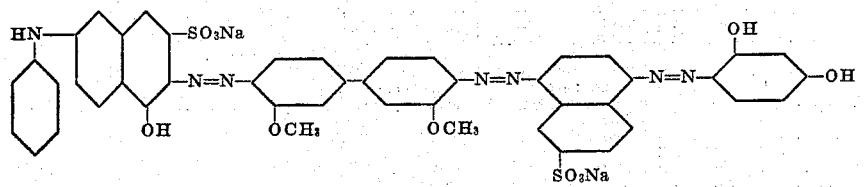

This product was a blue-black powder which when dyed and after-treated as in Example I yielded dyeings on regenerated cellulose rayon of a blue shade of violet which were bright and fast to washing.

EXAMPLE IV

Dianisidine (244 parts) was tetrazotized and coupled to 246 parts of 1-naphthol-4-sulfonic acid as directed to Example I. A solution of 396 parts of 4'-amino-3'-sulfo-phenyl-J-acid in 2000 parts of water was made with the aid of enough soda ash to leave the resulting solution just alkaline to brilliant yellow papers. To the latter solution soda ash (106 parts) was added and the solution was cooled to 5° C. The diazo slurry was slowly added to the solution over a period of about 20 minutes while maintaining good agitation, a temperature of 5° C. and soda-ash alkalinity in the coupling medium. The mixture was stirred for 1 hour, then heated to 65° C. and 15% of the volume of salt, or enough so that a spot of the suspension on white filter paper leaves only a light colored rim of solution, was added. The solids were filtered from the solution.

The press cake was slurried, diazotized and coupled to resorcinol as described in Example I. The product was isolated at 65° C. by salting to 20% on volume and filtering off the product.

The product is represented by the formula:

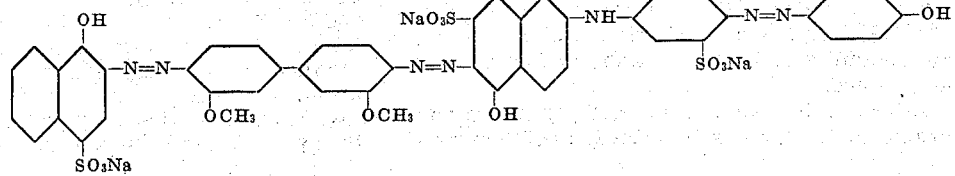

This product was a blue-black powder which when dyed and after-treated as described in Example I, yielding dyeings on regenerated cellulose rayon of a navy blue shade which were fast to washing.

EXAMPLE V

Dianisidine (244 parts) was tetrazotized and coupled to 342 parts of chromotropic acid using

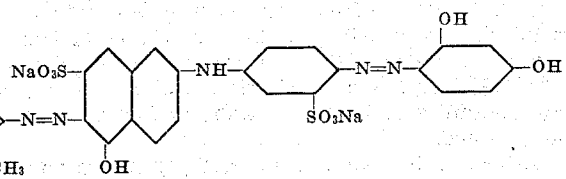

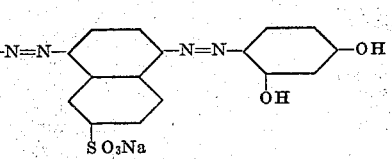

the procedure of Example II, except that the chromotropic acid was used in place of 246 parts of 1-naphthol-4-sulfonic acid of Example II. A solution was made by dissolving 239 parts of J-acid in about 2000 parts of water with the aid of enough soda ash to leave the resulting solution just alkaline to brilliant yellow. Then 106 parts of soda ash were added and the solution was cooled to 5° C. The diazo slurry was slowly added to the solution over a period of about 20 minutes while maintaining good agitation, a temperature of 5° C., and soda ash alkalinity in the coupling medium. After stirring for one hour, the mixture was heated to 65° C. and slowly salted to 15% on a basis of the volume, or enough salt so that a spot of the suspension on white filter paper left only a light colored rim of solution.

The solids were filtered off and the press cake was slurried and made acid to Congo red by adding about 100 parts of hydrochloric acid. After cooling the slurry to about 10° C., 69 parts of sodium nitrite were added as rapidly as it would react. An excess nitrite and medium Congo red acidity were maintained in the mixture for 2 hours.

S-acid (239 parts) was dissolved in 2000 parts of water with the aid of sufficient soda ash to leave the solution alkaline to brilliant yellow paper, 320 parts of soda ash were added and the solution was cooled to 0° C. The slurry of the diazo was added to this solution over a period of about ½ hour. Good agitation, sodium carbonate alkalinity and a temperature at 0–5° C. were maintained.

After stirring for one hour, the mixture was heated to 65° C. and salted slowly to 15% on volume or until a spot of the slurry on filter paper showed only a light rim of color.

The solids were then filtered off and this press cake was slurried in about 5000 parts of water, diazotized, coupled to resorcinol, isolated and dried as directed in Example II.

The product is represented by the formula:

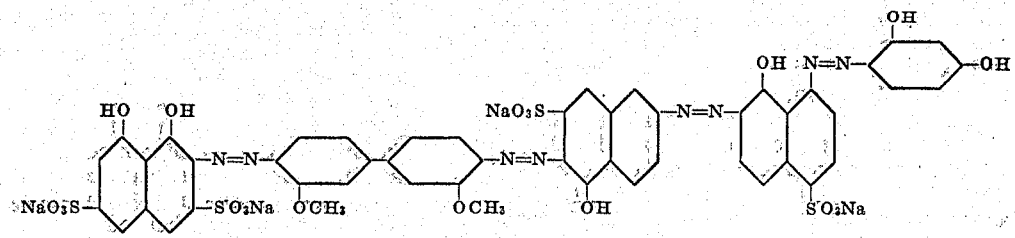

This product was a blue-black powder which when dyed and after-treated as in Example I, yielded dyeings on regenerated cellulose rayon of a green shade of blue which were fast to washing.

It is to be understood that the invention is not restricted to the details of the processes set forth in the above examples and that various modifications well known to the art can be made in the details of these processes without departing from the invention. The following are additional examples of the invention which were prepared by methods substantially similar to those heretofore given. The dyeings made on regenerated cellulose rayon had the improved characteristics of the dyes of the foregoing examples.

| Example | Y Component | X Component | A Component | B Component | C Component | Shade of formaldehyde after-treated dyeing |
|---|---|---|---|---|---|---|
| 6 | 1-naphthol-3-sulfonic acid | Dianisidine | 1,6-Cleve's acid | | Resorcinol | Red navy blue. |
| 7 | 1-naphthol-5-sulfonic acid | do | do | | do | Navy blue. |
| 8 | F-acid | do | do | | do | Do. |
| 9 | 2-benzoylamino-5-naphthol-7-sulfonic acid. | do | do | | do | Blue. |
| 10 | Dioxy-S-acid | do | do | | do | Do. |
| 11 | Epsilon acid | do | do | | do | Do. |
| 12 | 1-acetylamino-8-naphthol-4-sulfonic acid. | do | 1,7-Cleve's acid | | do | Do. |
| 13 | 7-chloro-1,3-hydroxy acid | do | do | 1,7-Cleve's acid | do | Do. |
| 14 | Benzoyl H-acid | do | do | do | do | Do. |
| 15 | Dioxy S-acid | do | 1,6-Cleve's acid | S-acid | do | Green blue. |
| 16 | do | do | J-acid | 1,6-Cleve's acid | do | Do. |
| 17 | Beta-oxy-naphthoic acid | do | 1,7-Cleve's acid | 1,7-Cleve's acid | do | Navy blue. |
| 18 | Phenyl-peri acid | do | 1,6-Cleve's acid | 1,7-Cleve's acid | do | Do. |
| 19 | 2,4-hydroxy acid | do | 1,7-Cleve's acid | | do | Do. |
| 20 | F-acid | do | Amino-Schaeffer's methyl ether. | | do | Blue. |
| 21 | Dioxy S-acid | Benzidine | 1,6-Cleve's acid | 1,6-Cleve's acid | do | Red navy blue. |
| 22 | do | Tolidine | do | do | do | Do. |
| 23 | do | Benzidine | Gamma acid | do | do | Do. |
| 24 | 1,5-hydroxy acid | Dianisidine | 4'-amino-3'-sulfophenyl J-acid. | 1,7-Cleve's acid | do | Do. |
| 25 | Beta-naphthol | do | do | | do | Do. |
| 26 | Dioxy S-acid | Tolidine | 1,6-Cleve's acid | | do | Do. |
| 27 | do | Dianisidine | do | | 3-5, dihydroxy benzoic acid. | Navy blue. |
| 28 | do | do | do | | Orcinol | Do. |
| 29 | do | do | do | | Phloroglucinol | Do. |
| 30 | do | do | do | | Resorcinol sulfonic acid. | Do. |
| 31 | 1,3-hydroxy acid | Tolidine | do | 1,6-Cleve's acid | Resorcinol | Do. |
| 32 | Dioxy S-acid | Dianisidine | do | do | 3,5-dihydroxy-benzoic acid. | Blue. |
| 33 | do | do | do | do | Orcinol | Do. |
| 34 | do | do | do | do | Phloroglucinol | Do. |
| 35 | do | do | do | do | Resorcinol sulfonic acid. | Do. |
| 36 | 1,4-hydroxy acid | do | Amino-Schaeffer's methyl ether. | 4'-amino-3'-sulfophenyl-J-acid. | Resorcinol | Do. |
| 37 | Dioxy S-acid | do | p-amino-benzoyl J-acid. | 1,6-Cleve's acid | do | Red navy blue. |
| 38 | do | do | 1,6-Cleve's acid | p-amino-benzoyl-J-acid. | do | Do. |
| 39 | 1,4-hydroxy acid | do | do | J-acid | do | Do. |
| 40 | do | do | do | Gamma acid | do | Do. |
| 41 | do | do | do | S-acid | do | Navy blue. |
| 42 | Dioxy S-acid | do | do | 1,6-Cleve's acid | do | Blue. |
| 43 | do | do | do | J-acid | do | Do. |
| 44 | do | do | do | Gamma acid | do | Do. |
| 45 | do | do | J-acid | | do | Do. |
| 46 | do | do | do | Gamma acid | do | Do. |
| 47 | do | do | do | S-acid | do | Do. |
| 48 | 1,5-hydroxy acid | do | 1,6-Cleve's acid | 1,6-Cleve's acid | do | Red blue. |

| Example | Y Component | X Component | A Component | B Component | C Component | Shade of formaldehyde after-treated dyeing |
|---|---|---|---|---|---|---|
| 49 | Chromotropic acid | Dianisidine | 1,6-Cleve's acid | 1,6-Cleve's acid | Resorcinol | Blue. |
| 50 | R-acid | do | do | | do | Red navy blue. |
| 51 | do | do | do | 1,6-Cleve's acid | do | Do. |
| 52 | Schaeffer's acid | do | do | | do | Navy blue. |
| 53 | do | do | do | 1,6-Cleve's acid | do | Red navy blue. |
| 54 | Phenyl J-acid | do | do | do | do | Blue violet. |
| 55 | Epsilon acid | do | do | do | do | Do. |
| 56 | 7-chloro-1,3-hydroxy acid | do | do | | do | Red blue. |
| 57 | 1,3-hydroxy acid | do | do | 1,6-Cleve's acid | do | Navy blue. |
| 58 | Dioxy S-acid | do | p - amino - benzoyl J-acid. | | do | Green blue. |
| 59 | Acetyl H-acid | do | 1,7-Cleve's acid | | do | Blue. |
| 60 | Acetyl S-acid | do | do | 1,7-Cleve's acid | do | Green blue. |
| 61 | Alpha-naphthol-3,6-disulfonic acid | do | do | | do | Red navy. |
| 62 | do | do | do | 1,7 Cleve's acid | do | Navy blue. |
| 63 | Ethyl chromotropic acid | do | 1,6-Cleve's acid | | do | Blue. |

In the foregoing table the terms 1,3-, 1,4-, 1,5- and 2,4-hydroxy acid refer to 1-naphthol-3,1-naphthol-4,1-naphthol-5- and 2-naphthol-4-sulfonic acids. Dioxy S-acid refers to 1,8-dihydroxy naphthalene - 4 - sulfonic acid. The terms F-, H-, J-, R-, S-, Epsilon- and Gamma-acid refer respectively to 2-naphthol-7-sulfonic acid, 1-amino-8-naphthol-3,6-disulfonic acid, 2-amino-5-naphthol-7-sulfonic acid, 2-naphthol-3,6-disulfonic acid, 1-amino-8-naphthol-4-sulfonic acid, 1-naphthol-3,8-disulfonic acid and 2-amino-8-naphthol-6-sulphonic acid. The terms acetyl H-acid and benzoyl H-acid refer respectively to 1-acetyl-amino- and 1-benzoyl-amino - 8 - naphthol - 3,6 - disulfonic acid. The terms acetyl S-acid and benzoyl J-acid refer to 1-acetylamino-8-naphthol-4-sulfonic acid and 2-benzoylamino-5-naphthol-7-sulfonic acid respectively.

Deeper shades and improved light fastness are produced by after-treatment of dyeings of these colors with metal salts, such as a soluble salt of copper. This metallizing may be carried out by a process similar to either of the procedures described above for the after-treatment with formaldehyde, except that 10 cc. of a five per cent solution of hydrated cupric sulfate is used instead of the formaldehyde solution. The after-treatment with a solution of a suitable metal salt is allowed to continue for about twenty minutes or until a metal complex is formed, and at the end of that time the treated dyeings are removed, rinsed and dried.

A further alternative procedure has been found to give a marked improvement in fastness properties both to light and to washing. This consists in a combination of the formaldehyde and after-metallizing treatment. This double after-treatment operation may be done either in the dyebath or in a fresh bath as described in Example I. It consists in adding the formaldehyde solution as described, and after about twenty minutes a soluble copper salt is added, for example. After twenty minutes' treatment with the copper salt solution, the dyeings are removed, rinsed and dried. Water soluble metal salts of various metals can be used instead of copper for metallizing the dyeings, those having atomic weights between 50 and 65 being the most suitable. Copper sulfate, nickel chloride and cobalt acetate are typical of the metal salts which have been found suitable. The after-treatment is believed to produce formaldehyde or metal complexes or both complexes, as the case may be, and the after-treatment may be varied within reasonable limits.

The symbol Y represents a naphthol or an N-substituted naphthylamine sulfonic acid of the class which is represented by the formulae

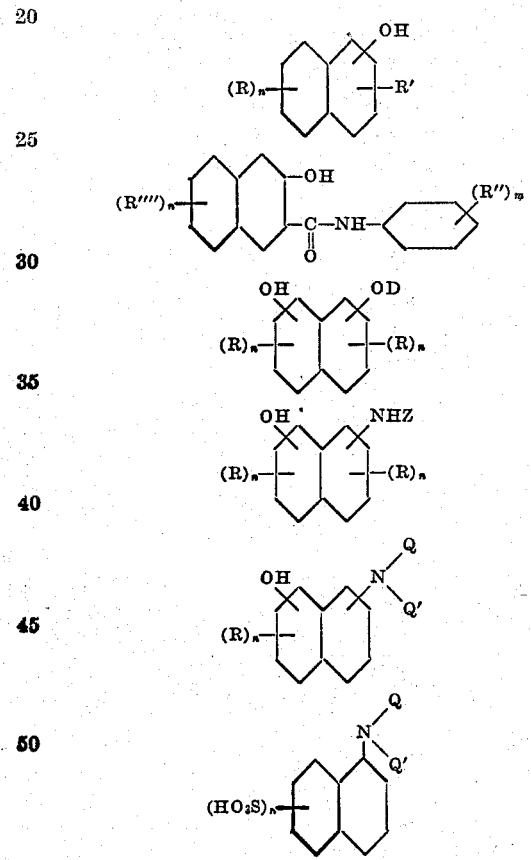

in which R is from the group consisting of hydrogen, halogen and sulfonic acid; R' is from the group consisting of hydrogen, carboxyl and sulfonic acid; R'' is from the group consisting of hydrogen, halogen, alkyl having 1 to 6 carbons, the corresponding alkoxy groups, carboxyl and sulfonic acid; R''' '' is hydrogen or halogen; D is one of a group consisting of hydrogen and alkyl having 1 to 6 carbons; Q is one of a group consisting of alkyl having 1 to 6 carbons, aryl such as phenyl, tolyl, ethyl-phenyl, hexyl-phenyl and similar poly-substituted aryl groups and aralkyl such as benzyl, phenylethyl, phenylhexyl and similar poly-substituted aralkyls; Q' is one of a group consisting of hydrogen and Q; Z is one of a group consisting of acetyl, benzoyl, acetylamino benzoyl, benzoylamino benzoyl, and carbomethoxy; $n$ is 1 to 2 and $m$ is 1 to 3. In the compounds represented by the above formulae there is always an open coupling position adjacent to hydroxy. As other illustrations of Y components, the following are mentioned:

Beta naphthol,
1-hydroxy-naphthalene-4-sulfonic acid,
1-hydroxy-7-chlor-naphthalene-3-sulfonic acid,
2-hydroxy-naphthalene-6,8-disulfonic acid,
2-hydroxy-3-carboxy-naphthalene - 7 - sulfonic acid,
1-hydroxy-naphthalene-3-sulfonic acid,
2-hydroxy-3-naphthoic acid-anilide -4'- sulfonic acid,
2-hydroxy-3'-methyl -3- naphthoic acid-anilide-7-sulfonic acid,
2-hydroxy-2'-methyl -3',5'- dichloro-3-naphthoic acid-anilide-7-sulfonic acid,
2-hydroxy-2',5'-dimethoxy - 3 - naphthoic acid-anilide-7-sulfonic acid,
2-hydroxy-3'-carboxy-3-naphthoic acid anilide,
1,8-dihydroxy-naphthalene-4-sulfonic acid,
1,8-dihydroxy-naphthalene-3,6-disulfonic acid,
2-acetylamino-5-naphthol-7-sulfonic acid,
1-benzoylamino-5-naphthol-7-sulfonic acid,
3-(4'-benzoylamino)-benzoylamino) - 5 - naphthol-7-sulfonic acid,
2-carbomethoxy-amino - 5 - naphthol-7-sulfonic acid,
2-phenylamino-5-naphthol-7-sulfonic acid,
1-methylamino-5-naphthol-7-sulfonic acid,
3-(methyl-phenyl-amino)-5-naphthol-7-sulfonic acid,
2-benzoylamino-5-naphthol-7-sulfonic acid,
1-tolylamino-5-naphthol-7-sulfonic acid,
Methyl chromotropic acid and
Hexyl chromotropic acid.

The symbol X represents a diamino-biphenyl compound which is represented by the formula

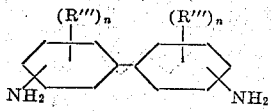

wherein R''' is from the group consisting of hydrogen, halogen, alkyl having 1 to 6 carbons and the corresponding alkoxy groups. As other illustrations of such compounds, the following are mentioned: benzidine, tolidine, dianisidine, 3,3'-dichloro-6,6'-dimethyl benzidine, 2,2'-dichloro tolidine, 3,3'-dichloro benzidine, 6,6'-dichloro-dianisidine, 2,2', 3,3'-tetra-metthyl-benzidine and 3,3'-dibromo-benzidine.

The components A and B of the general formulae are selected from compounds of the group represented in general by the formulae:

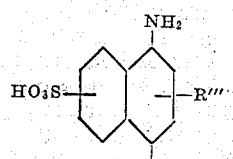

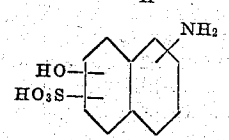

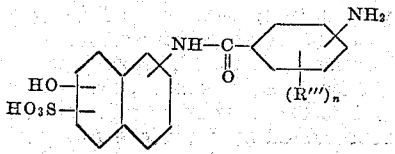

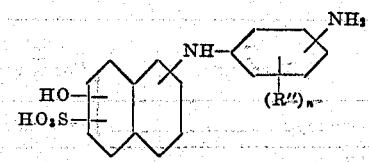

wherein —H represents an open coupling position, R and $n$ have the values hereinbefore explained and in which SO₃H and OH are in meta positions to each other. As other illustrations of A and B components are 1,6-Cleve's acid, 1-amino-2-methoxy-naphthalene-6-sulfonic acid, 2-(4' - amino - 3' - sulfo - phenylamino) - 5' - naphthol-7-sulfonic acid, 2-amino-5-naphthol-7-sulfonic acid, 2-(4'-amino-benzoylamino)-5-naphthol-7-sulfonic acid, 3-(4'-amino-phenylamino)-5 - naphthol - 7 - sulfonic acid, 2-(4'-amino-2'-methyl - phenylamino) - 5 - naphthol - 7 - sulfonic acid, 2-(4'-amino-3'-sulfo-5'-propyl phenylamino) - 5 - naphthol - 7 - sulfonic acid, 2-(4' - amino - 3' - chloro - benzoylamino) - 5-naphthol-7-sulfonic acid, 1,7-Cleve's acid, 1-amino-2-ethoxy-naphthalene-6-sulfonic acid, 3-amino-5-naphthol-7-sulfonic acid, 2-amino-6-naphthol-8-sulfonic acid, 1-amino-5-naphthol-7-sulfonic acid, 2-(3'-amino-4'-methoxy-benzoylamino)-5-naphthol-7-sulfonic acid.

The symbol C stands for a compound of the 1,3-dihydroxy benzene series represented by the formula

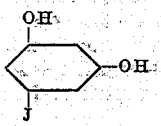

in which J is one of a group consisting of hydrogen, halogen, alkyl having 1 to 6 carbons, the corresponding alkoxy groups, hydroxy, amino, carboxy and sulfonic acid. As other illustrations of C components are mentioned 3,5-dihydroxy-benzoic acid, 1,3,5-trihydroxy benzene, 3,5-dihydroxy-methyl-benzene and 3,5-dihydroxy-benzene-1-sulfonic acid.

Any of the above described components can be used in the combinations indicated to give products having properties similar to those which are more specifically described, but the several components must be selected so that the product will contain at least two solubilizing groups, but more than two solubilizing groups may be present. In general the preferred dyes are those in which the C component is resorcinol. Dyeings in the deeper shades of blue are attained where the X component is dianisidine.

The brightest shades are produced in general by the dyes in which the Y component is a naphthol, that is Y has one or two hydroxy groups. Of these the dyes having good solubility and the best affinity are the trisazo dyes in which the A component has one solubilizing group and the tetrakisazo dyes in which the A and B components each has one solubilizing group, and wherein the C component is resorcinol. Of these preferred classes, the trisazo dyes are preferred where high tinctorial power is desired.

By this invention are provided dyeings in deep shades of blue which do not appreciably stain associated uncolored fibers when the dyed goods are washed. The washing fastness of the dyeings is unusually good, being equal to and sometimes better than the washing fastness of diazo colors. The invention provides dyes in shades of blue which can be applied with a smaller number of operations than the diazo colors, only one dyebath being necessary both for the dyeing and the after-treatment. The dyeings made with the dyes of the present invention do not change shade or lose brightness when they are after-treated with formaldehyde as do the diazo colors when they are developed.

From the foregoing disclosure it will be recognized that the invention is susceptible of modification without departing from the spirit and scope thereof and it is to be understood that the invention is not restricted to the specific illustrations thereof herein set forth.

I claim:

1. An azo dye which in the form of its acid is represented by the formula

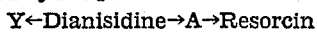

wherein Y represents one of the group consisting of 1,8-dihydroxy-naphthalene-3,6-disulfonic acid, 1,8-dihydroxy-naphthalene-4-sulfonic acid and 1-hydroxy-naphthalene-4-sulfonic acid, and A is one of the group consisting of 1-naphthylamine-6- and 7-sulfonic acids.

2. A dyestuff which in its acid form is represented by the formula

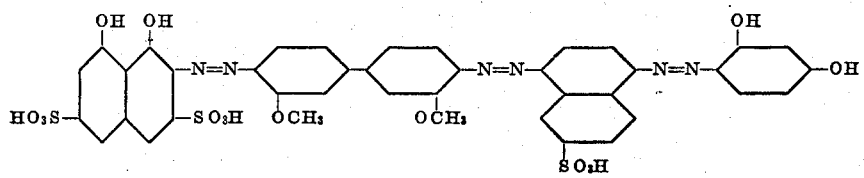

3. A dyestuff which in its acid form is represented by the formula

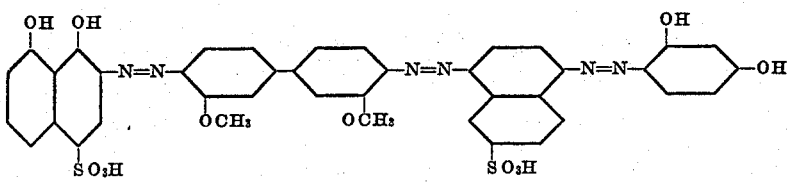

4. A dyestuff which in its acid form is represented by the formula

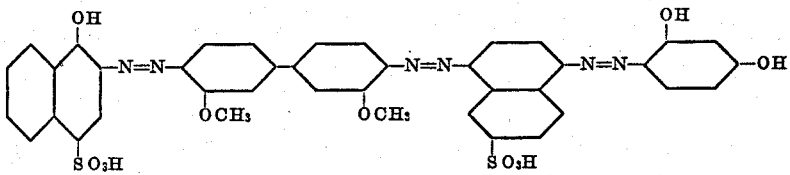

5. The formaldehyde complex of a compound of claim 1.
6. The formaldehyde complex of a compound of claim 2.
7. The formaldehyde complex of a compound of claim 3.
8. The formaldehyde complex of a compound of claim 4.
9. The process of manufacturing a trisazo dyestuff which comprises tetrazotizing dianisidine, coupling with one mol equivalent each of two other compounds, Y and A, said compound Y being one of the group consisting of 1,8-dihydroxy-naphthalene-3,6-disulfonic acid, 1,8-dihydroxy-naphthalene-4-sulfonic acid and 1-hydroxy-naphthalene-4-sulfonic acid, and A being one of the group consisting of 1-naphthylamine-6- and 7-sulfonic acids; diazotizing the resulting disazo compound and coupling the resulting diazo compound with one mole equivalent of resorcin.

CHILES E. SPARKS.